(No Model.)
I. E. WRIGHT.
BARBED FENCE.
No. 249,817.            Patented Nov. 22, 1881.
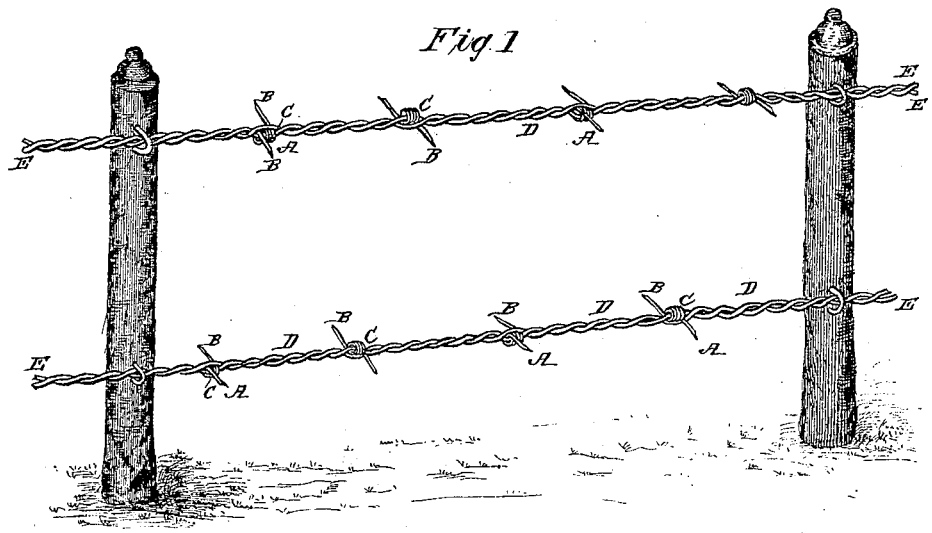
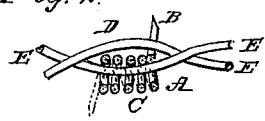
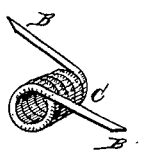
WITNESSES
Fred. G. Dieterich
John W. Brockett
INVENTOR
I. E. Wright
by
C. A. Snow & Co. Attorneys

UNITED STATES PATENT OFFICE.

IVY E. WRIGHT, OF CHARLOTTESVILLE, INDIANA.

BARBED FENCE.

SPECIFICATION forming part of Letters Patent No. 249,817, dated November 22, 1881.

Application filed August 31, 1881. (No model.)

*To all whom it may concern:*

Be it known that I, IVY E. WRIGHT, of Charlottesville, in the county of Hancock and State of Indiana, have invented certain new and useful Improvements in Barbed Fences; and I do hereby declare that the following is a full, clear, and exact description of the invention, which will enable others skilled in the art to which it appertains to make and use the same, reference being had to the accompanying drawings, which form a part of this specification.

Figure 1 is a perspective view of a section of fence-wire having my improved barb attached. Fig. 2 is a longitudinal vertical sectional view, and Fig. 3 is a view of the barb detached from the wire.

Corresponding parts in the several figures are denoted by like letters of reference.
This invention relates to barbed-wire fences; and it consists in the combination, with a twisted fence-wire, of a peculiarly-constructed coiled or flexible barb, as will be hereinafter fully described, and particularly pointed out in the claim.

In the drawings hereto annexed, A represents my improved barb, which is constructed of a single piece of wire, pointed at the ends, as at B B, and formed with a series of coils, C C, which, the barb being made of spring-wire, are possessed of considerable elasticity.

The fence-wire D consists of two single wires, E E, twisted together, as shown, the barbs A being strung upon one of the wires at suitable intervals, and secured by the twisting of the wires.

In operation my improved barbed fence has a very important advantage, which is this: When horses or cattle rub against the fence they will be pricked by the barbs, and thus cautioned to withdraw; but by the sideward movement which the animal will naturally make in order to escape from the barb, the latter will not lacerate the flesh or cause any serious injury, but, being elastic, it will "give" and permit the animal to escape without serious injury, and as soon as the animal escapes the coils will cause the barb to spring back to its original and only really effective position.
My invention has an additional advantage, viz: The barb being provided with a series of coils, it is rendered more distinctly visible, and the animals will thus much sooner learn to avoid or keep off from the fence.

I am aware of reissue No. 6,913 to J. F. Glidden, in which a coil having two projecting points is secured rigidly on the twisted fence-wire, the barb being tightly coiled around one of the wires and held rigidly in position by the sides of the loop in the twisted wire; but with this construction the points of the barbs are liable to bend when the animal comes in contact with them, as they are held rigidly and prevented from turning on the wire by the relative position of the projecting points of the barb and the sides of loop in the twisted fence-wire in which the barb is secured; or, should the wire forming the barb be too heavy or thick to bend, it will lacerate the sides of the animal, owing to its rigidity and non-elasticity; but in my invention these disadvantages are obviated. The central opening through the coil of the barb is much larger than the fence-wire, so that it will fit loosely thereon, as plainly illustrated in Fig. 3 of the drawings, and turn in either direction when slight pressure is applied, and when the pressure is removed the elasticity of the coil will enable it to immediately resume its normal position, and yet effect its purpose of warning the animal without injuring him.

Having thus described my invention, I claim and desire to secure by Letters Patent of the United States—

As an improvement in barbed-wire fences, the herein-described coiled barb, having its central opening, formed by the coil, much larger than the wire forming the twisted fence-wire, on which it is loosely secured, so as to turn in either direction by the application of slight pressure, and by the elasticity of the coil immediately resume its normal position when the pressure is removed, substantially as and for the purpose herein shown and specified.

In testimony that I claim the foregoing as my own I have hereto affixed my signature in presence of two witnesses.

IVY E. WRIGHT.

Witnesses:
M. J. SCUFFLE,
R. H. GRUBBS.